United States Patent [19]

Jurisch et al.

[11] 4,202,171
[45] May 13, 1980

[54] APPARATUS FOR DISPENSING FUEL FOR A GAS TURBINE ENGINE

[75] Inventors: Wilhelm Jurisch, Nellingen; Christian Greune, Fürstenfeldbruck; Karl Maier, Munich, all of Fed. Rep. of Germany

[73] Assignee: Motoren- und Turbinen-Union GmbH, Fed. Rep. of Germany

[21] Appl. No.: 870,676

[22] Filed: Jan. 19, 1978

[30] Foreign Application Priority Data

Jan. 22, 1977 [DE] Fed. Rep. of Germany ......... 270259

[51] Int. Cl.$^2$ ............................................... F02C 9/08
[52] U.S. Cl. .......................... 60/39.28 R; 137/625.63; 137/625.64; 91/387
[58] Field of Search ................. 137/625.63, 625.64; 91/387; 60/39.28 R

[56] References Cited

U.S. PATENT DOCUMENTS

| | | | |
|---|---|---|---|
| 2,411,748 | 11/1946 | Kelley | 91/387 |
| 2,754,843 | 7/1956 | Hauber | 91/387 |
| 2,947,285 | 8/1960 | Baltus et al. | 91/387 |
| 2,966,891 | 1/1961 | Williams | 91/387 |
| 3,208,352 | 9/1965 | Lucien | 91/387 |
| 3,229,588 | 1/1966 | Czernek | 91/387 |
| 3,454,026 | 7/1969 | Orme | 137/625.64 |
| 3,866,416 | 2/1975 | Lewis | 60/39.28 R |

FOREIGN PATENT DOCUMENTS

| | | | |
|---|---|---|---|
| 1006666 | 4/1957 | Fed. Rep. of Germany | 91/387 |
| 956045 | 7/1949 | France | 91/387 |
| 734621 | 8/1955 | United Kingdom | 91/387 |

*Primary Examiner*—Robert E. Garrett
*Attorney, Agent, or Firm*—Craig & Antonelli

[57] ABSTRACT

Fuel dispensing apparatus for dispensing fuel to a gas turbine engine is provided which includes a fuel metering slide valve having a control slide piston which directly controls an opening for supply of fuel to a gas turbine engine. A piston-cylinder servo-mechanism is provided for controlling flow of a servo fluid which acts on the control slide piston to assist in the movement thereof between respective positions. An auxiliary control slide piston of the servo-mechanism is in turn acted upon by supply of pressure to respective oppositely facing pressure surfaces from an electro-hydraulic converter. The electro-hydraulic converter is controlled by an electronic control mechanism responsive to control an engine operating parameters. In order to attenuate the effects due to the servo-mechanism supplying servo-assist fluid pressure to the control slide piston, a feedback signal arrangement including a coil spring abutting oppositely facing surfaces of the auxiliary control piston and the control piston, as well as pressure fluid acting on oppositely facing pressure faces of said pistons is provided. Also, an electrical signal generating means is provided for supplying an electrical signal to the electronic control mechanism, which electrical signal is a direct function of the instantaneous position of the control slide piston of the metering valve.

11 Claims, 1 Drawing Figure

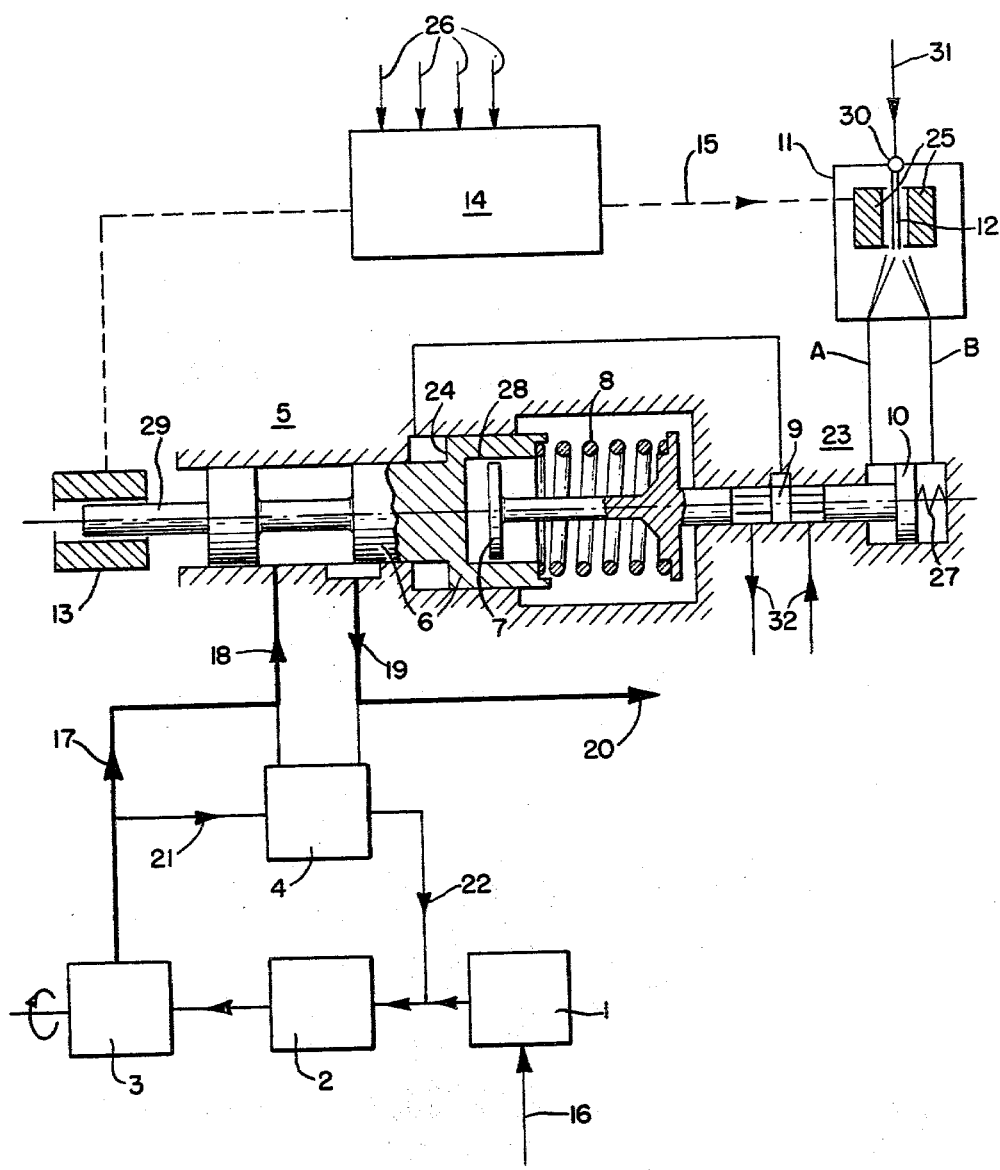

APPARATUS FOR DISPENSING FUEL FOR A GAS TURBINE ENGINE

BACKGROUND AND SUMMARY OF THE INVENTION

The invention relates to a device for dispensing fuel for a gas turbine engine of the type comprising an electrohydraulic converter as the first servo-mechanism (booster) stage, a second servo-mechanism (booster) stage, and a fuel metering slide valve, wherein the thus-dispensed quantity of fuel has a desired relationship to an electric signal transmitted to the electrohydraulic converter.

One task to be accomplished in connection with gas turbine engines is to dispense the quantity of fuel in dependence on certain engine parameters. In most recent times, electrohydraulic devices have been developed for this purpose, making it possible to electrically detect various measuring magnitudes and transform same, etc., and then to feed a signal corresponding to the fuel quantity desired to an electrohydraulic converter. This converter has the purpose of transforming this electrical signal of low power into a hydraulic signal, to amplify this hydraulic signal, and to feed this signal to a fuel metering slide valve. On account of the energy required to actuate this metering slide valve and due to the low power generally generated by the electrohydraulic converter, control devices for larger engines require a further hydraulic booster or servo-mechanism stage. This further booster stage has the purpose of amplifying the signal of the electrohydraulic converter and to activate the fuel metering slide valve.

This metering slide valve is inserted between a fuel feed pump and an injection means so that a change of the stroke of this slide valve corresponds to a change in the fuel feed. In this arrangement, the pressure difference at the metering cross section of the metering slide valve is, in most cases, maintained at a constant value. The metering slide valve uncovers a greater or lesser amount of flow area, so that the amount of fuel flowing to the engine is dependent to the desired extent on the stroke of the metering slide valve.

In gas turbine engines, there is the requirement for large changes in fuel quantity within extremely short periods of time. The booster stage arranged between the electrohydraulic converter and the metering slide valve must be designed so that it provides the required high power. This can result in instabilities.

It is an object of the invention to avoid these instabilities without losing the high regulating speed of the fuel metering slide valve, i.e. the large change in fuel quantity during extremely brief time periods. In this connection, the stabilizing means are desired to be fashioned, insofar as feasible, so that no disadvantages arise with respect to weight and expenses.

In order to solve the aforementioned problems, the invention contemplates providing that the fuel metering slide valve is coupled back to the second booster stage. This feedback is, in particularly preferred embodiments, proportional to the difference of the distances and velocities of the regulating control slide piston of the metering slide valve and of an auxiliary control slide piston of the second booster stage. In certain particularly preferred embodiments, the velocity-proportional feedback force is produced at a displacement piston connected to the auxiliary control slide piston. According to the invention, a feedback action is involved from the metering slide valve, especially by a piston area arranged at the second booster stage, exerting a force on the second booster stage proportional to the difference between the regulating speed of the regulating piston of the metering slide valve and the regulating speed of the just-mentioned auxiliary control slide piston.

These and further objects, features and advantages of the present invention will become more obvious from the following description when taken in connection with the accompanying drawing which shows, for purposes of illustration only, a single embodiment in accordance with the present invention.

BRIEF DESCRIPTION OF THE DRAWING

The single drawing FIGURE schematically depicts fuel supply apparatuses for a gas tubrine engine with a control apparatus constructed in accordance with a preferred embodiment of the invention.

DETAILED DESCRIPTION OF THE DRAWING

In order not to obscure what applicants' consider as their invention, the drawing only schematically depicts, and the following description only generally describes many of the mechanisms of the complete fuel supply arrangement. Given the state of the art, those or ordinary skill in the art of the invention should readily be able to practice the invention using the present disclosure.

The fuel is fed from a fuel tank, not shown, to a supply pressure pump 1, arrow 16 schematically depicting feeding of fuel from a fuel tank to pump 1. The fuel passes via a fuel filter 2 to a primary fuel pump (high-pressure pump) 3 driven by a gas turbine engine and pumping the fuel by way of a fuel metering slide valve 5, the metering area of which is adjustable, to an injection device, not shown, of the engine, arrows 17-20 schematically depicting the respective fuel flows, arrow 20 depicting a fuel line leading to a gas turbine engine. The pressure drop at the metering slide valve 5 is maintained constant by returning fuel not required for the metering feed via a differential pressure valve 4 to the intake side of the pump 3, arrows 21 and 22 depicting the respective fuel flows. The regulating control slide piston 6 of the metering slide valve 5 is adjusted, via a second hydraulic booster stage 23 with an auxiliary control slide piston 9, by means of an electrohydraulic converter 11 representing a first booster stage, so that a desired predetermined relationship exists between an electric signal 15 and the dispensed quantity of fuel. The two booster stages operate as follows: The electric signal 15, formed in an electronic controller 14 from specific parameters of the engine fed thereto, arrows 26 depicting such engine parameters, is transmitted to a coil 25 of the electrohydraulic converter 11. The converter 11 comprises a jet pipe 12 pivotable by the magnetic force of coil 25 about an axle 30, pipe 12 being supplied with hydraulic fluid or the fuel as the servo fluid, arrow 31 depicting the servo fluid flow into jet pipe 12. A pressure difference is picked up at two outputs A and B and transmitted to the two sides (pressure forces) of an auxiliary control piston 10 supported by a spring 27 on the side depicted at the right-hand side in the drawing. This auxiliary control piston is fixedly connected to the auxiliary control piston 9 of the second booster stage 23. The auxiliary control piston 9 is displaced in correspondence with the pressure difference applied and uncovers apertures through which servo fluid under pressure can flow, (arrows 32) to an end face 24 of the regulating control slide piston 6. On the opposite side of the end face 24, the regulating piston 6 is supported by way of a spring (restoring spring) 8 with respect to the auxiliary control slide piston 9 and thus with respect to the pressure differential of the jet pipe 12. Furthermore, a displacement piston 7 part is provided which dips into an axial, central blind hole 28 of the regulating piston 6, a pressure being produced on this piston part 7 which is dependent on the difference of the regulating speeds of the regulating piston 6 and of the auxiliary control slide piston 9. The back indication of the piston of the regulating piston 6 to the controller 14 is executed by a coil 13 into which extends an axial, central rod 29 of the regulating piston 6.

While we have shown and described one embodiment in accordance with the present invention, it is understood that the same is not limited thereto but is susceptible of numerous changes and modifications as known to those skilled in the art and we therefore do not wish to be limited to the details shown and described herein but intend to cover all such changes and modifications as are encompassed by the scope of the appended claims.

We claim:

1. Fuel dispensing apparatus for dispensing fuel for a gas turbine engine comprising:
   a fuel metering slide valve which directly controls the supply of fuel to a gas turbine engine in dependence on the position of a movable control slide piston of said metering slide valve,
   a first servo-mechanism including an electro hydraulic converter responsive to electrical input signals to control the flow of a first servo-fluid supply,
   a second servo-mechanism for controlling the flow of a second servo-fluid supply which acts on the control slide piston to control the position of said control slide piston, said second servo-mechanism being in turn controlled by the first servo-fluid supply from said first servo-mechanism,
   and feedback signal means for supplying the second servo-mechanism with a feedback signal which is the function of the position of the control slide piston of the metering valve,
   whereby high regulating speed of said control slide piston is obtained due to the servo-mechanism, while instabilities in the operation of the metering valve are limited by the feedback signal means,
   wherein said second servo-mechanism includes a movable auxiliary control slide piston which controls the flow of the second servo-fluid supply to said control slide piston, and wherein the feedback signal means includes means for supplying a feedback signal which is proportional to the distance between, and the related velocities of, the control slide piston and the auxiliary control slide, piston, and
   wherein said feedback signal means includes fluid in a common chamber contacted by respective facing pressure faces of said control slide piston and said auxiliary control slide piston.

2. Apparatus according to claim 1, wherein said first servo-mechanism includes means for selectively directing the flow of said first servo-fluid supply to respective oppositely facing pressure faces of said auxiliary control slide piston in response to said electrical input signals.

3. Apparatus according to claim 2, wherein said electrical input signals are controlled by an electronic control mechanism in dependence on operating and control parameters of a gas turbine engine being supplied with fuel by way of said fuel metering slide valve.

4. Apparatus according to claim 3, wherein electrical signal generating means are provided for supplying an electrical signal to said electronic control mechanism, which is a direct function of the position of said control slide piston.

5. Apparatus according to claim 1, wherein the auxiliary control slide piston has a displacement piston part which dips into an axial, central blind hole of the control slide piston, and wherein an end face of the displacement piston part forms one of the facing pressure faces.

6. Fuel dispensing apparatus for dispensing fuel for a gas turbine engine comprising:
   a fuel metering slide valve which directly controls the supply of fuel to a gas turbine engine in dependence on the position of a movable control slide piston of said metering slide valve,
   a first servo-mechanism including an electrohydraulic converter responsive to electrical input signals to control the flow of a first servo-fluid supply,
   a second servo-mechanism for controlling the flow of a second servo-fluid supply which acts on the control slide piston to control the position of said control slide piston, said second servo-mechanism being in turn controlled by the first servo-fluid supply from said first servo-mechanism,
   and feedback signal means for supplying the second servo-mechanism with a feedback signal which is the function of the position of the control slide piston of the metering valve,
   whereby high regulating speed of said control slide piston is obtained due to the servo-mechanism, while instabilities in the operation of the metering valve are limited by the feedback signal means,
   wherein said second servo-mechanism includes a movable auxiliary control slide piston which controls the flow of the second servo-fluid supply to said control slide piston, and wherein the feedback signal means includes means for supplying a feedback signal which is proportional to the distance between, and the related velocities of, the control slide piston and the auxiliary control slide piston, and
   wherein said feedback signal means includes a spring abutting at respective facing surfaces of said control slide piston and said auxiliary control slide piston.

7. Apparatus according to claim 6, wherein said feedback signal means includes fluid in a common chamber contacted by respective facing pressure faces of said control slide piston and said auxiliary control slide piston.

8. Apparatus according to claim 7, wherein said first servo mechanism includes means for selectively directing the flow of said first servo-sluid supply to respective oppositely facing pressure faces of said auxiliary control slide piston in response to said electrical input signals.

9. Apparatus according to claim 8, wherein said electrical input signals are controlled by an electronic control mechanism in dependence on operating and control parameters of a gas turbine engine being supplied with fuel by way of said fuel metering slide valve.

10. Apparatus according to claim 9, wherein electrical signal generating means are provided for supplying an electrical signal to said electronic control mechanism, which is a direct function of the position of said control slide piston.

11. Apparatus according to claim 6, wherein the auxiliary control slide piston has a displacement piston part which dips into an axial, central blind hole of the control slide piston, and wherein an end face of the displacement piston part forms one of the facing pressure faces.

* * * * *